United States Patent [19]

Tang et al.

[11] Patent Number: 5,776,875
[45] Date of Patent: Jul. 7, 1998

[54] USE OF BIODEGRADABLE POLYMERS IN PREVENTING SCALE BUILD-UP

[75] Inventors: Jiansheng Tang, Naperville; Ronald V. Davis, Geneva, both of Ill.

[73] Assignee: Nalco Chemical Company, Naperville, Ill.

[21] Appl. No.: 683,001

[22] Filed: Jul. 16, 1996

[51] Int. Cl.$^6$ .................................................. C02F 5/10
[52] U.S. Cl. .................... 510/247; 252/181; 528/310; 528/313; 528/319; 528/322; 528/379.1; 528/331; 528/347; 210/699; 210/700
[58] Field of Search ................................. 252/180, 181; 510/247; 210/699, 700; 528/310, 313, 319, 322, 329.1, 331, 347

[56] References Cited

U.S. PATENT DOCUMENTS

| | | |
|---|---|---|
| 4,534,881 | 8/1985 | Sikes et al. . |
| 4,585,560 | 4/1986 | Sikes et al. . |
| 4,587,021 | 5/1986 | Wheeler et al. . |
| 4,603,006 | 7/1986 | Sikes et al. . |
| 4,866,161 | 9/1989 | Sikes et al. . |
| 4,868,287 | 9/1989 | Sikes et al. . |
| 5,041,291 | 8/1991 | Bader et al. ............... 424/426 |
| 5,051,401 | 9/1991 | Sikes . |
| 5,116,513 | 5/1992 | Koskan et al. . |
| 5,247,068 | 9/1993 | Donachy et al. . |
| 5,260,272 | 11/1993 | Donachy et al. . |
| 5,284,936 | 2/1994 | Donachy et al. . |
| 5,328,690 | 7/1994 | Sikes . |
| 5,496,914 | 3/1996 | Wood et al. ............... 528/328 |
| 5,506,335 | 4/1996 | Uhr et al. ............... 528/322 |
| 5,527,863 | 6/1996 | Wood et al. ............... 525/432 |

*Primary Examiner*—Prince Willis, Jr.
*Assistant Examiner*—Cephia Toomer
*Attorney, Agent, or Firm*—Hill Steadman & Simpson

[57] ABSTRACT

A biodegradable scale inhibitor and dispersant is provided. The scale inhibitor includes a copolymer comprising at least one of N-oxygenatedhydrocarbonamide monomers and at least one of amino acid monomers. A method of reducing scale build-up on heating exchanger surfaces that come in contact with an industrial water is provided by adding a copolymer comprising at least one of N-oxygenatedhydrocarbonamide monomers and at least one of amino acid monomers to the water system such as cooling towers.

20 Claims, No Drawings

USE OF BIODEGRADABLE POLYMERS IN PREVENTING SCALE BUILD-UP

BACKGROUND OF THE INVENTION

The present invention relates generally to the protection of metallic surfaces from scaling and the accumulation of other deposits. More specifically, the present invention relates to scale inhibiting compositions, dispersants and methods of using the same.

To efficiently transfer heat from a metal surface, such as the inside surface of a boiler or heat exchanger tube, to any liquid medium such as water, or vice versa, the surface of the metal should be as clean and as free of scales and deposits as possible. Simply put, scaling and other deposits on the metal surface will reduce the rate of heat transfer between the metal surface and the water or other fluid medium and therefore scaling and deposits will reduce the efficiency of the system. Further, scaling and deposits can lead to premature corrosion of metallic surfaces.

The most common way to combat scaling and deposit accumulation in aqueous systems is to add scale-inhibiting additives and dispersants to the feedwater or solution. However, currently available scale-inhibiting additives and dispersants are nonbiodegradable, which limits the applicability of such additives.

Scaling and deposits in industrial heat exchange systems may come in a variety of forms and originate from a variety of sources. Typically, scales and deposits are caused by calcium ions, magnesium ions, iron ions, zinc ions and clay particulates.

More specifically, said scales and deposits include but are not limited to alkaline earth metal phosphates, alkaline earth metal carbonates, alkaline earth metal sulfates, iron (hydro) oxides, zinc hydroxides, manganese oxides, aluminum (hydro)oxides, clays and silicates.

For example, industrial water, such as the water used in cooling towers, heat exchangers and boilers, is often treated with a variety of inorganic and organic phosphorus-containing compounds. These compounds tend to produce calcium phosphate and magnesium phosphate scales which adhere to cooling tower surfaces, heat exchanger tubes, and boiler surfaces.

Further, soluble iron may be introduced into an aqueous system by its presence in the feedwater or in other ways. Soluble iron is generally believed to be iron in the form of $Fe^{++}$. Soluble iron, as this term is used herein, does not exclude, however, other forms of iron that are soluble in a given water system. In aqueous systems, and particularly industrial aqueous water systems, the presence of soluble iron in the feedwater, or the introduction of a soluble iron species into the system by other means such as corrosion, can lead to the undesirable precipitation of iron oxides and iron hydroxides which may settle and accumulate as deposits on surfaces that come in contact with the water. Such precipitates commonly occur where water containing soluble iron ions is changed to a more oxidation-prone environment. Also, precipitation will occur where an oxidizing agent such as oxygen, chlorine and the like is introduced or increased.

Further, many industrial water systems such as those used in the operation of cooling towers are treated with soluble zinc salts. Such soluble zinc salts tend to form undesired scales in alkaline solutions or in the presence of other precipitating anions such as phosphate.

Finally, clay particulates may be introduced into an aqueous system by the presence of clay in the feedwater. Accumulation of clay particulates tends to form deposits on metallic heat exchangers or metal surfaces of boilers.

The aforementioned scales and deposits reduce heat transfer, accelerate corrosion or cause other problems resulting in reduced system efficiencies.

Currently, certain polyacrylates and polyacrylamides are used to inhibit the build-up of scales in aqueous systems. However, polyacrylates and polyacrylamides are not biodegradable and thus accumulate in the environment upon release from the water treatment systems. Thus, there is need for biodegradable compositions that are capable of inhibiting the build-up of scales and deposits on metallic surfaces. Although polyaspartic acid is biodegradable, it does not effectively inhibit the build-up or scales and deposits on metallic surfaces.

SUMMARY OF THE INVENTION

The present invention provides a family of compositions that reduce or inhibit development and build-up of scales and deposits on metallic surfaces and a method of reducing development and build-up of scales and deposits on metallic surfaces. The family of compositions provided by the present invention includes copolymers comprising at least one of N-oxygenatedhydrocarbonamides and at least one of amino acids.

The scale inhibiting compositions of the present invention comprise copolymers comprising at least one N-oxygenatedhydrocarbonamide or its salt of the general formulas I-α and I-β as shown below with at least one amino acid compound having the general formula (II) as shown below.

The N-oxygenatedhydrocarbonamide or salt thereof of the general formulas I-α and I-β are as follows:

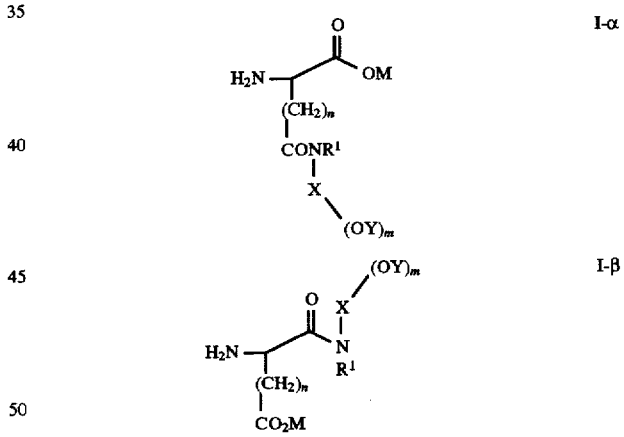

or a mixture of forms I-α and I-β in ratios ranging from 1:99 to 99:1 and wherein M may be hydrogen, a metal, an alkali metal ion, an alkaline earth metal ion or $NH_4^+$, $Al^{+3}$, $Fe^{+3}$, $Fe^{+2}$, $Zn^{+1}$ or mixtures thereof; m ranges from 1 to 10; n may be 1 or 2; $R^1$ may be hydrogen, a $C_1$ to $C_{30}$ alkyl group or an aryl group or an alkyl or aryl group that is substituted with one or more of OH, $SO_3M$ (wherein M is H or a metal), $PO_3M_2$ (wherein M is H or a metal), COM (wherein M is OH, OR, or $NR_2$ wherein R is an alkyl of 3 to 4 carbon atoms); X may be a $C_1$ to $C_{30}$ alkylene or arylene; Y may be H, a $C_1$ to $C_4$ alkyl, $SO_3M'$ or a mixture thereof wherein M is a H or a metal ion.

Further, X may be a straight or branched-chain alkylene group having one to thirty carbon atoms or a straight or branched-chain alkylene or arylene group substituted with one or more of the following: OH, $SO_3M'$ (wherein M' is H or metal), PO₃M₂ (wherein M is H or metal), COM (wherein M is OH, OR, or NR₂ wherein R is an alkyl of 3 to 4 carbon atoms).

Still further, $X(OY)_m$ may be —CHR³CH₂(OCHR³CH₂)$_p$(OCH₂CH₂)$_o$OR⁴ or —CH₂CH₂(NR⁵CH₂CHR⁶)$_r$OR⁴ where R³ is H or CH₃ or mixtures thereof; o ranges from zero to 50; p ranges from zero to 50; o+p ranges from 1 to 50; r ranges from zero to 50; R⁴ is a C₁ to C₄ alkyl group; R⁵ is a C₁ to C₄ alkyl group; R⁶ may be H, CH₃ or SO₃M where M may be H, alkaline metal ions or N(R⁷)₄ where R⁷ is H, a benzyl group or a C₁ to C₄ alkyl group.

The amino acid compound having the general formula (II) is as follows:

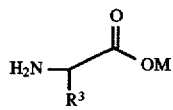

(II)

wherein R₃ is a radical defined by the list of amino acids and amino acid derivatives appearing below. If formula (II) is aspartic acid, the aspartic acid unit in the copolymer is in its αform or βform or a mixture form of α:β ranging from 99:1 to 1:99.

The amino acids of the general formula (II) (wherein M is H, a metal, alkaline metal ions, earth alkaline metal ions, NH₄⁺, Al⁺³, Fe⁺², Fe⁺³ or mixtures thereof) include alanine, arginine, aspartic acid, asparagine, cysteine, glutamine, glutamic acid, glycine, histidine, isoleucine, leucine, lysine, methionine, serine, threonine, tryptophan, tyrosine, valine, proline and phenylalanine. The following amino acid derivatives can be utilized as well; hydroxyproline, γ-carboxyglutamic acids or salts thereof, o-phosphoserine, o-phosphotyrosine, o-sulfoserine, o-sulfotyrosine, o-phophothreonine, o-sulfothreonine, s-sulfocysteine, s-phosphocysteine, side chain N-substituted asparagine with C₁ to C₃₀ alkyl, aryl, alkyl or sulfoalkyl, o-sulfoaryl, o-sulfoalkyl, o-phosphoalkyl, o-phosphoaryl, o-phosphoalkyl, c-sulfonoaryl, c-sulfono alkyl, c-sulfonoalkyl, —(—CH₂CH₂O—)$_s$—R² and —(—CH₂CH₂NR²—)$_t$—R³, where R¹ and R² are H or a C₁ to C₄ alkyl group and R³ is a C₁ to C₄ alkyl group, both s and t range from 1 to 50.

The repeating molar units of formulas I-α and I-β linked in the copolymer backbone are described as the following:

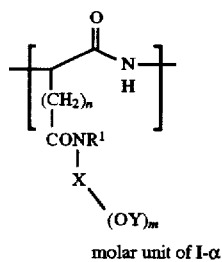

molar unit of I-α

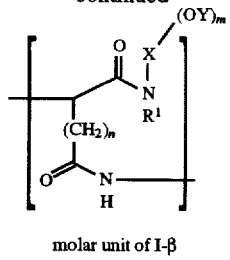

molar unit of I-β

The repeating molar units of formula II linked in the copolymer backbone are described as the following:

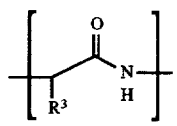

molar unit of II

If the amino acid of formula II is aspartic acid or its salts, the aspartic acid repeating molar units linked in the copolymer backbone are described as shown below:

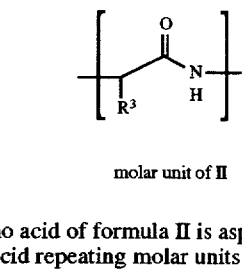

molar unit of aspartic acid (II), α-form

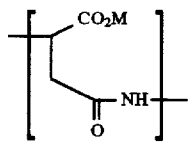

molar unit of aspartic acid (II), β-form

All D, L and DL-optical sources of formula I and II monomers can be utilized.

The molecular weight of the polymers of the present invention can vary from about 500 to about 200,000. A preferred molecular weight range is from 500 to 80,000; a more preferred molecular weight range is from 500 to 40,000.

The copolymers of the present invention are biodegradable and extremely effective scale inhibitors of alkaline earth metal phosphates such as calcium phosphate and magnesium phosphate. The above copolymers are also effective in inhibiting scales and deposits of alkaline earth metal sulfates, iron (hydr)oxide, zinc hydroxide, aluminum (hydr) oxide, clays, calcium carbonate, silicates and other scales. These biodegradable copolymers are highly calcium tolerant. The polymers of the present invention are more effective and efficient as dispersants and scale inhibitors than unmodified polyamino acids such as unmodified polyaspartic acids.

In an embodiment, the N-oxygenatedhydrocarbonamide of the general formula (I) is N-2-hydroxyethylaspartamide or N-2-hydroxyethylglutamide.

In an embodiment, the N-oxygenatedhydrocarbonamide of the general formula (I) N-3-hydroxypropylaspartamide or N-3-hydroxypropyglutamide.

In an embodiment, the N-oxygenatedhydrocarbonamide of the general formula (I) is N-2-hydroxypropylaspartamide or N-2-hydroxypropyglutamide.

In an embodiment, the N-oxygenatedhydrocarbonamide of the general formula (I) is N-1-methyl-2,3-dihydroxypropylaspartamide or N-1-methyl-2,3-dihydroxypropyglutamide.

In an embodiment, the N-oxygenatedhydrocarbonamide of the general formula (I) is N-1-ethyl-2,3-dihydroxypropylaspartamide or N-1-ethyl-2,3-dihydroxypropyglutamide.

In an embodiment, the N-oxygenatedhydrocarbonamide of the general formula (I) is N-2,3-dihydroxypropylaspartamide or N-2,3-dihydroxypropyglutamide.

In an embodiment, the N-oxygenatedhydrocarbonamide of the general formula (I) is N-1-hydroxymethyl-2,3-dihydroxypropylaspartamide or N-1-hydroxymethyl-2,3-dihydroxypropyglutamide.

In an embodiment, the N-oxygenatedhydrocarbonamide of the general formula (I) is N-bis(2-hydroxyethyl)aspartamide or N-bis(2-hydroxyethyl)glutamide.

In an embodiment, the N-oxygenatedhydrocarbonamide of the general formula (I) is N-(3-bis(N-hydroxyethyl)amino)propyl-1-amidoaspartamide or N-(3-bis(N-hydroxyethyl)amino)propyl-1-amidoglutamide.

In an embodiment, the N-oxygenatedhydrocarbonamide of the general formula (I) is N-p or O- or m-phenolaspartamide or N-p or O- or m-phenolaspartamideglutamide.

In an embodiment, the N-oxygenatedhydrocarbonamide of the general formula (I) is N-2(2-hydroxyethoxy)ethylaspartamide or N-2-(2-hydroxyethoxy)ethylglutamide.

In an embodiment, the N-oxygenatedhydrocarbonamide of the general formula (I) is N-dihydroxyphenylaspartamide or N-dihydroxyphenylglutamide.

In an embodiment, the N-oxygenatedhydrocarbonamide of a general formula (I) is N-2-(2-hydroxyethoxy)ethylaspartamide or N-2-(2-hydroxyethoxy)ethylglutamide.

In an embodiment, the N-oxygenatedhydrocarbonamide of the general formula (I) is N-2-(2-hydroxyethylamino)ethylaspartamide or N-2(2-hydroxyethylamino)ethylglutamide.

In an embodiment, the N-oxygenatedhydrocarbonamide of the general formula (I) is N-2-methoxyethylaspartamide or N-2-methoxyethylglutamide.

In an embodiment, the N-oxygenatedhydrocarbonamide of the general formula (I) is N-(2-o-sulfatoethyl)aspartamide or N-(2-o-sulfathoethyl)glutamide.

In an embodiment, the amino acid compound of the general formula (II) (wherein M is H or metal) is aspartic acid.

In an embodiment, the amino acid compound of the general formula (II) (wherein M is H or metal) is glutamic acid.

In an embodiment, the amino acid compound of the general formula (II) (wherein M is H or metal) is asparagine.

In an embodiment, the amino acid compound of the general formula (II) (wherein M is H or metal) is glutamine.

In an embodiment, the amino acid compound of the general formula (II) (wherein M is H or metal) is histidine.

In an embodiment, the amino acid compound of the general formula (II) (wherein M is H or metal) is arginine.

In an embodiment, the amino acid compound of the general formula (II) (wherein M is H or metal) is lysine.

In an embodiment, the amino acid compound of the general formula (II) (wherein M is H or metal) is alanine.

In an embodiment, the amino acid compound of the general formula (II) (wherein M is H or metal) is cysteine.

In an embodiment, the amino acid compound of the general formula (II) (wherein M is H or metal) is glycine.

In an embodiment, the amino acid compound of the general formula (II) (wherein M is H or metal) is isoleucine.

In an embodiment, the amino acid compound of the general formula (II) (wherein M is H or metal) is leucine.

In an embodiment, the amino acid compound of the general formula (II) (wherein M is H or metal) is methionine.

In an embodiment, the amino acid compound of the general formula (II) (wherein M is H or metal) is proline.

In an embodiment, the amino acid compound of the general formula (II) (wherein M is H or metal) is serine.

In an embodiment, the amino acid compound of the general formula (II) (wherein M is H or metal) is threonine.

In an embodiment, the amino acid compound of the general formula (II) (wherein M is H or metal) is tryptophan.

In an embodiment, the amino acid compound of the general formula (II) (wherein M is H or metal) is tyrosine.

In an embodiment, the amino acid compound of the general formula (II) (wherein M is H or metal) is valine.

An advantage of the present invention is to provide a new family of water soluble polymers which are biodegradable and which are effective scale inhibitors and dispersants.

Another advantage of the present invention is to achieve high-performance scale inhibition using alkanolamine modified polyamino acids.

Still another advantage of the invention is to provide a family of biodegradable polymers which simultaneously disperse particulate matter and inhibit many types of scales in aqueous systems, especially in industrial aqueous systems.

Another advantage of the present invention is to provide a method of achieving high-performance scale inhibition using alkanolamine modified polyamino acids.

Another advantage of the present invention is to provide a method of reducing scale and deposit build-up by utilizing a new family of water soluble polymers which are biodegradable and are effective scale inhibitors and dispersants.

Another advantage of the present invention is to provide an improved scale and deposit inhibiting composition for use in connection with metallic surfaces.

Still another advantage of the present invention is to provide an improved scale and deposit inhibiting composition that is biodegradable.

A further advantage of the present invention is to provide an improved scale and deposit inhibiting composition which also reduces corrosion.

Yet another advantage of the present invention is to provide a new use for N-oxygenatedhydrocarbonamide and salts thereof.

Another advantage of the present invention is to provide a new use for amino acids and salts thereof.

A further advantage of the present invention is to provide improved scale-inhibiting compositions which have aqueous and non-aqueous applications.

Additional features and advantages are described in, and will be apparent from, the detailed description of the presently preferred embodiments.

DETAILED DESCRIPTION OF THE PRESENTLY PREFERRED EMBODIMENTS

The present invention provides an improved scale and deposit inhibiting composition that is environmentally acceptable. In a preferred embodiment, the scale inhibiting composition is a copolymer comprising at least one of N-oxygenatedhydrocarbonamide monomers and at least one of an amino acid monomers. The N-oxygenatedhydrocarbonamides or salt thereof of the general formulas I-α and I-β as shown below:

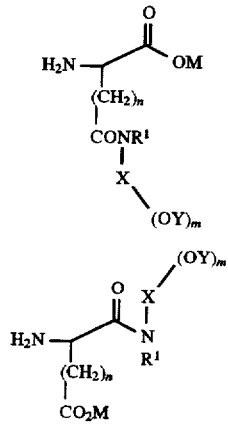

or a mixture of forms I-α and I-β in ratios ranging from 1:99 to 99:1 and wherein M may be hydrogen, a metal, an alkali metal ion, an earth alkaline metal ion or $NH_4^+$, $Al^{+3}$, $Fe^{+3}$, $Fe^{+2}$, $Zn^{+1}$, or mixtures thereof; m ranges from 1 to 10; n may be 1 or 2; $R^1$ may be hydrogen, a $C_1$ to $C_{30}$ alkyl group or an aryl group or alkyl or aryl group having from one to thirty carbon atoms, or an alkyl or aryl group that is substituted with one or more of OH, $SO_3M$ (wherein M is H or a metal), $PO_3M_2$ (wherein M is H or a metal), COM (wherein M is OH, OR, or $NR_2$ wherein R is an alkyl of 3 to 4 carbons); X may be a $C_1$ to $C_{30}$ alkylene or arylene (straight or branched) or a straight or branched-chain alkylene group having one to thirty carbon atoms or a straight or branched-chain alkylene or arylene group substituted with one or more of OH, $SO_3M$ (wherein M is H or a metal), $PO_3M_2$ (wherein M is H or a metal), COM (wherein M is OH, OR, or $NR_2$ wherein R is an alkyl of 3 to 4 carbons); Y may be H, $C_1$ to $C_4$ alkyl, $SO_3M$ or mixture thereof wherein M may be hydrogen or a metal ion.

Further, X $(OY)_m$ may be $-CHR^3CH_2$, $(OCHR^3CH_2)_p$ $(OCH_2CH_2)_oOR^4$ or $-CH_2CH_2$ $(NR^5CH_2CHR^6)_rOR^4$ where $R^3$ is H or $CH_3$ or mixtures thereof; o ranges from zero to 50; p ranges from zero to 50; o+p ranges from 1 to 50; r ranges from zero to 50; $R^4$ is a $C_1$ to $C_4$ alkyl group; $R^5$ is a $C_1$ to $C_4$ alkyl group; $R^6$ may be H, $CH_3$ or $SO_3M$ where M may be H, earth metal ions, alkai metal ions or $N(R^7)_4$ where $R^7$ is H, a benzyl group or a $C_1$ to $C_4$ alkyl group.

Acceptable examples of the N-oxygenatedhydrocarbonamide compounds of the general formula (I) include N-2-hydroxyethylaspartamide or N-2-hydroxyethylglutamide, N-3-hydroxypropylaspartamide or N-3-hydroxypropylglutamide, N-2-hydroxypropylaspartamide or N-2-hydroxypropylglutamide, N-1-methyl-2,3-dihydroxypropylaspartamide or N-1-methyl-2,3-dihydroxypropylglutamide, N-1-ethyl-2,3-dihydroxypropylaspartamide or N-1-ethyl-2,3-dihydroxypropylglutamide, N-2,3-dihydroxypropylaspartamide or N-2,3-dihydroxypropylglutamide, N-1-hydroxymethyl-2,3-dihydroxypropylaspartam ide or N-1-hydroxymethyl-2,3-dihydroxypropylglutamide, N-bis (2-hydroxyethyl) aspartamide or N-bis(2-hydroxyethyl)glutamide, N-(3-bis (N-hydroxyethyl))aminopropylaspartamide or N-bis(2-hydroxyethyl) aspartamide or N-bis (2-hydroxyethyl) glutamide, N-(3-bis(N-hydroxyethyl)) aminopropylaspartamide or N-bis(2-hydroxyethyl) aminopropylglutamide, N-p or m- or o-phenolaspartamide or N-p or m- or o-phenoglutamide and N-dihydroxyphenylaspartamide or N-dihydroxyphenylglutamide, N-2-(2-hydroxyethoxyethylaspartamide) or N-2- (2-hydroxyethoxy) ethylglutamide, N-2-hydroxyethylamino)ethylaspartamide or N-2-(hydroxyethylamino)ethylglutamide, N-2-methoxyethylaspartamide or N-2-methoxyethylglutamide, N-(2-o-sulfatoethyl)aspartamide or N-(2-o-sulfatoethyl) glutamide.

The more preferred oxygenated hydrocarbonamides of the formula (I) are N-2-hydroxyethylaspartamide, N-2-hydroxypropylaspartamide, N-1-methyl-2,3-dihydroxypropylaspartamide, N-1-ethyl-2,3-dihydroxypropylaspartamide and N-1-hydroxymethyl-2,3-dihydroxypropylaspartamide.

The amino acid monomer is of the general formula (II) as shown below:

wherein $R^3$ is a radical defined by the list of amino acids and amino acid derivatives appearing below. If formula (II) is aspartic acid, the aspartic acid unit in the copolymer is in its α form or β form or a mixture form of α:β ranging from 99:1 to 1:99.

The amino acids the general formula (II) (wherein M is H or metal) include alanine, arginine, aspartic acid, asparagine, cysteine, glutamine, glutamic acid, glycine, histidine, isoleucine, leucine, lysine, methionine, serine, threonine, tryptophan, tyrosine, valine, proline, and phenylalamine. The metal M is an alkaline metal, a metal ion, earth alkaline metal ion or $NH_4^+$, $Al^{+3}$, $Fe^{+3}$, $Fe^{+2}$, or $zn^{+1}$. The following amino acid derivatives can be utilized as well; hydroxyproline, γ-carboxyglutamic acids or salts thereof, o-phosphoserine, o-phosphotyrosine, o-sulfoserine, o-sulfotyrosine, o-phophothreaonine, o-sulfothreonine, s-sulfocysteine, s-phosphocysteine, side chain N-substituted asparagine with $C_1$ to $C_{30}$ alkyl, aryl, alkyl or sulfoalkyl, o-sulfoaryl, o-sulfoalkyl, o-phosphoalkyl, o-phosphoaryl, o-phosphoalkyl, c-sulfonoaryl, c-sulfono alkyl, c-sulfonoalkyl, $-(-CH_2CH_2O-)_sR^1$, and $-(-CH_2CH_2NR^2-)_t-R^3$, wherein $R^1$ and $R^2$ are H or a $C_1$ to $C_4$ alkyl group and $R^3$ is a $C_1$ to $C_4$ alkyl group, both s and t range from 1 to 50.

The repeating molar units of formulas I-α and I-β linked in the copolymer backbone are described as the following:

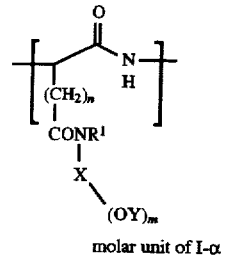

molar unit of I-α

-continued

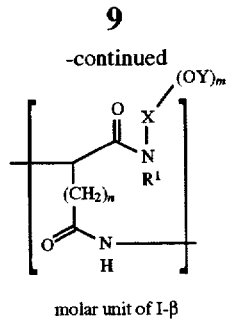

molar unit of I-β

The repeating molar units of formula II linked in the copolymer backbone are described as the following:

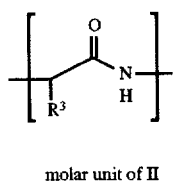

molar unit of II

If the amino acid of formnula II is aspartic acid or its salts, the aspartic acid repeating molar units linked in the copolymer backbone are described as shown below:

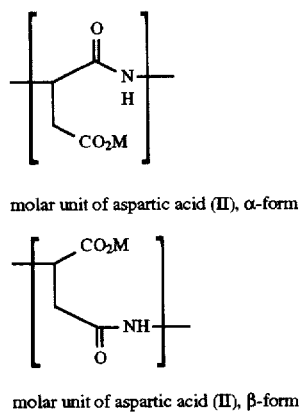

molar unit of aspartic acid (II), α-form molar unit of aspartic acid (II), β-form The preferred amino acids of the formula II are aspartic acid or its salts, and glutamic acid or its salts. The more preferred amino acids of the formula II is aspartic acid or its salts. The aspartic acid molar units in the copolymer chains are in the form of α-form or β-form or a mixture at a ratio of α:β ranging from 1:99 to 99:1.

All D, L and DL optical sources of formula I and II monomers can be utilized. Mole ratios of the two monomer units in the polymer can range from 1:99 to 99:1. Examples of effective mole ratios are provided in the examples presented below. Preferably, the ratio of formula (I) to formula (II) ranges from 80:20 to 10:90, more preferably from 40:60 to 15:85.

Appropriate dosages will depend upon the water treated and the minerals present in the water as indicated in the examples presented below. Effective dosages can range from 0.1 ppm to 500 ppm, more preferably 5 to 50 ppm, still more preferably from 5 to 30 ppm.

By way of example, and not limitation, examples of the present invention will now be given. Other scales which can be reduced by using the polymers invented are barium sulfate, calcium carbonate, calcium oxylate, calcium sulfate, etc.

EXAMPLES

The inhibitory power of the polymers of the present invention were evaluated using activity tests employing test chemicals of reagent grade. Specifically, calcium, magnesium, zinc and bicarbonate were respectively supplied by reagent grade $CaCl_2 \cdot 2H_2O$, $MgSO_4 \cdot 7H_2O$, $ZnSO_4 \cdot 7H_2O$, and $NaHCO_3 \cdot 7H_2O$ respectively. The orthophosphate was supplied by $H_3PO_4$. The polymer concentrations used in each test were indicated in Tables 1–5.

Each test solution was stirred with a teflon coated stir bar in a jacketed glass beaker. The temperature was maintained using a Landa recirculating, constant-temperature basin. The pH was determined with Fisher Accumat meter (model 6100A) and a combination electrode. The pH meter was calibrated with two standard buffers (pH 7 and 10) and corrections were made for temperature changes.

EXAMPLE I

CALCIUM AND MAGNESIUM PHOSPHATE SCALE INHIBITION TEST

Soluble calcium and magnesium were added to provide initial concentrations of 250 and 125 ppm as $CaCO_3$, respectively. An equal amount of orthophosphate (10 ppm as $PO_4$) was added to each test solution, and the inhibitor concentrations are listed in Table 1. The temperature of the test solution was maintained at 158° F. (70° C.). Using dilute aqueous NaOH, the pH was slowly increased to 8.5 and maintained during the four hour duration of the test. Mineral solubility calculations indicate that supersaturation values for the calcium phosphate of greater than 10,000 ppm and magnesium phosphate of greater than 600oppm were initially present. As a result, the system was under highly a stressed condition. At the conclusion of each test, each solution was filtered with a 0.45 μm filter and the orthophosphate concentration was determined spectrophotometrically after formation of a blue phosphomolybdate complex.

The inhibition of calcium and magnesium phosphate scale formation is determined using Equation 1 below:

$$\% \text{ inhibition} = \frac{[\text{filtered} - \text{blank}]}{[\text{initial} - \text{blank}]} \quad \text{(Equation 1)}$$

where, filtered=concentration of phosphate ion in filtrate in the presence of the inhibitor of the present invention after four hours;

initial=concentration of phosphate ion in the test solution at time zero; and blank=concentration of phosphate ion in the filtrate in the absence of any inhibitor after four hours.

Using the above method, a number of polymer compositions were tested. The results are listed in Table 1.

TABLE 1

Calcium and Magnesium Phosphate Scale Inhibition with N-oxygenatedhydrocarbonamide/amino acid copolymers
(250 ppm $Ca^{++}$/125 ppm $Mg^{++}$/10 ppm $PO_4$ unless where it is indicated)

| | | | % Phosphate salt inhibition ppm polymer dose | | | | | | | | | | |
|---|---|---|---|---|---|---|---|---|---|---|---|---|---|
| Sample | Polymer composition, Mol % | MW | 2 | 3 | 4 | 5 | 6 | 7 | 8 | 10 | 15 | 20 | 30 |
| A1 | 50/50 L-2-hydroxyethylaspartamide/aspartic acid | 16000 | 9 | 8 | 23 | 50 | 67 | 82 | 86 | 96 | | 98 | |
| A1 | 50/50 L-2-hydroxyethylaspartamide/aspartic acid | 16000 | | | | 4 | | | | 5* | 11* | 35* | 57* |
| A2 | 28/72 L-2-hydroxyethylaspartamide/aspartic acid | 33000 | | 8 | | 9 | | | | 89 | | 98 | |
| A3 | 50/50 L-2-hydroxyethylaspartamide/aspartic acid | 16500 | 9 | 10 | 31 | 61 | 81 | 88 | 82 | | | | |
| A4 | 10/90 L-2-hydroxyethylaspartamide/aspartic acid | 16400 | | 9 | | 10 | | | | 10 | | 10 | |
| A5 | 20/80 L-2-hydroxyethylaspartamide/aspartic acid | 16500 | | 8 | | 10 | | | | 12 | | 10 | |
| A6 | 80/20 L-2-hydroxyethylaspartamide/aspartic acid | 13300 | | 9 | | 9 | | | | 11 | | 42 | |
| B1 | 29/71 L-2-(2-methyl-1,3-dihydroxypropyl)aspartamide/aspartic acid | 34000 | | 9 | | 9 | | | | 86 | | 95 | |
| C1 | polyaspartic acid | 17000 | | | | | | | | 8 | | | |
| C2 | polyaspartic acid | 25000 | | | | | | | | 9 | | | |
| C3 | polyaspartic acid | 90000 | | | | | | | | 4 | | | |
| C4 | polyaspartic acid | 92000 | | | | | | | | 4 | | | |
| C5 | polyaspartic acid | 94000 | | | | | | | | 6 | | | |
| D1 | non-biodegradable commercial product I | — | | 8 | | 13 | | | | 91 | | 99 | |

*These tests were done under high hardness stress conditions (1200 ppm $Ca^{++}$ and 10 ppm orthophosphate).

EXAMPLE II

IRON (HYDR)OXIDE SCALE INHIBITION TEST

In a standard test, soluble calcium and magnesium were added to provide initial concentrations of 360 and 200 ppm as $CaCO_3$ respectively. An equal amount of soluble iron (10 ppm) was added to each test solution, and the inhibitor concentrations are listed in Table 2. The temperature of the test solution was maintained at 140° F. (60° C.). Using a dilute aqueous NaOH solution, the pH was slowly increased to 8.5 and maintained during the two hour duration of heating at 140° F. (60° C.). At the end of 2 hour heating period, the samples were removed from the water bath and allowed to stand undisturbed at room temperature for 24 hours. The samples were then taken from the top portion of each aliquot and analyzed for iron content by atomic absorption analysis. The iron concentration in the aliquot correlates directly with the inhibition activity of the polymer. That is, the higher the iron concentration in the top part of the aliquot, the higher was the inhibition activity of the polymer tested.

The inhibition of iron (hydr)oxide is determined as indicated as Equation 2:

$$\% \text{ inhibition} = \frac{[\text{final} - \text{blank}]}{[\text{initial} - \text{blank}]} \times 100 \quad \text{(Equation 2)}$$

where, final=concentration of iron ion in unfiltered samples of the top portion after 2 hours heating and 24 hours standing in the presence of inhibitor;

initial=concentration of iron ion in the test solution at time zero; and blank=concentration of iron ion in unfiltered samples of the top portion after 2 hours heating and 24 hours standing in the absence of inhibitor.

Using the above method, a number of polymer compositions were tested. The results are listed in Table 2.

TABLE 2

Iron (Hydr)oxide Scale Inhibition with N-oxygenatedhydrocarbonamide/amino acid copolymers

| | | | Iron (hydr)oxide Scale inhibition at ppm polymer dose | | | |
|---|---|---|---|---|---|---|
| Sample | Polymer composition, Mol % | MW | 3 | 5 | 10 | 20 |
| A1 | 50/50 L-2-hydroxyethyl-aspartamide/aspartic acid | 16000 | 21 | | 92 | 92 |
| A2 | 28/72 L-2-hydroxyethyl-aspartamide/aspartic acid | 33000 | 0 | 92 | 100 | 95 |
| A4 | 10/90 L-2-hydroxyethyl-aspartamide/aspartic acid | 16400 | 0 | 0 | 0 | 5 |
| A5 | 20/80 L-2-hydroxyethyl-aspartamide/aspartic acid | 16500 | 0 | 0 | 29 | 76 |
| A6 | 80/20 L-2-hydroxyethyl-aspartamide/aspartic acid | 13300 | 4 | 28 | — | 100 |
| B1 | 29/71 L-2-(2-methyl-1,3-dihydroxypropyl)aspartamide/aspartic acid | 34000 | | | | 85 |
| C1 | polyaspartic acid | 17000 | | | 7 | |
| C2 | polyaspartic acid | 25000 | | | 14 | |
| C3 | polyaspartic acid | 90000 | | | 7 | |
| C4 | polyaspartic acid | 92000 | | | 1 | |
| C5 | polyaspartic acid | 94000 | | | 2 | |
| D1 | non-biodegradable commercial product I | | 0 | 2 | 100 | 100 |

EXAMPLE III

ZINC HYDROXIDE SCALE INHIBITION TEST

In a standard test, soluble calcium and magnesium were added to provide initial concentrations of 150 and 100 ppm as $CaCO_3$ respectively. An equal amount of soluble zinc (5 ppm) was added to each test solution, and the inhibitor concentrations are listed in Table 3. The testing bottles were sealed. The temperature of the test solution was maintained at 110° F. (43° C.). Using a dilute aqueous NaOH solution, the pH was slowly increased to 9.1 and maintained during the 24 hour duration of the test. At the end of 24 hour heating period, the solution was filtered (0.2μm) and the filtered sample was analyzed for zinc concentration by atomic absorption analysis.

The inhibition of zinc (hydr)oxide is determined as indicated as Equation 3:

$$\% \text{ inhibition} = \frac{|\text{filtered} - \text{blank}|}{|\text{initial} - \text{blank}|} \times 100 \quad \text{(Equation 3)}$$

where, filtered=concentration of zinc ion in filtrate in the presence of the inhibitor of the present invention after 24 hours;

initial=concentration of zinc ion in the test solution at time zero;

blank=concentration of zinc ion in filtrate samples in the absence of the inhibitor of the present invention after 24 hours.

Using the above method, a number of polymer compositions were tested. The results are listed in Table 3.

TABLE 3

Zinc Hydroxide Scale Inhibition with
N-oxygenatedhydrocarbonamide/aspartic acid copolymers

| | | | Zinc Hydroxide Inhibition at ppm polymer dose | |
|---|---|---|---|---|
| Sample | copolymer composition | MW | 10 | 20 |
| A1 | 50/50 L-2-hydroxyethyl-aspartamide/aspartic acid | 16000 | 24 | 71 |
| A4 | 10/90 L-2-hydroxyethyl-aspartamide/aspartic acid | 16400 | 4 | 13 |
| A5 | 20/80 L-2-hydroxyethyl-aspartamide/aspartic acid | 16400 | 75 | 80 |
| B1 | 29/71 L-2-(2-methyl-1,3-dihydroxypropyl)-aspartamide/aspartic acid | 34000 | 70 | 63 |
| D1 | non-biodegradable commercial product I | | 87 | 92 |

EXAMPLE IV

CLAY PARTICULATE INHIBITION TEST

This test examines the dispersion ability of the polymers of the present invention for particulate matter. The assumption is that polymers which promote dispersancy will reduce the settling rate of clay particles and particulate matter in general. The dispersed clay causes higher turbidity.

A standard suspension of particulate (clay) was prepared in an aqueous solution of 300 ppm soluble calcium as $CaCO_3$. One liter of this solution was placed in a Waring blender to which 100 ml of china clay was added. The clay was dispersed for 60 seconds on low setting then immediately dispersed equally amount in four 250ml graduated cylinders. One cylinder became the blank while the remaining three test inhibitor treatment. The blank was returned to the blender and re-dispersed for 20 seconds on low. This suspension was returned to its graduated cylinder. A sample was withdrawn from a level of 100 ml and the turbidity was determined with a turbidimeter (Hach 2100A). This represented the initial reading for blank. The suspension was returned to the graduated cylinder and allowed to settle for 2 hours. Treatment cylinders are prepared by returning the remaining suspensions, in turn, to the blender, followed by the addition of 5 ppm inhibitor and redispersed for 20 seconds on low. Treatment cylinders are allowed to settle for 2 hours. At the end of 2 hours, samples are withdrawn from a level of 100 ml and turbidity readings taken.

Percent clay dispersancy is determined using the following Equation 4 and the results are listed in Table 4.

$$\% \text{ clay disp.} = \frac{\text{final treatment turb.} - \text{final blank turb.}}{\text{initial blank turb.} - \text{final blank turb.}} \times 100 \quad \text{(Equation 4)}$$

TABLE 4

Clay Particulate Dispersancy with
N-oxygenatedhydrocarbonamide/amino acid copolymers

| Sample | copolymer composition | MW | Clay particulate dispersancy at ppm polymer dose 5 ppm |
|---|---|---|---|
| A4 | 10/90 L-2-hydroxyethyl-aspartamide/aspartic acid | 16400 | 40 |
| A5 | 20/80 L-2-hydroxyethyl-aspartamide/aspartic acid | 16500 | 32 |
| A6 | 80/20 L-2-hydroxyethyl-aspartamide/aspartic acid | 13300 | 52 |
| B1 | 29/71 L-2-(2-methyl-1,3-dihydroxypropyl)-aspartamide/aspartic acid | 34000 | 40 |
| D1 | non-biodegradable commercial product I | | 50 |

EXAMPLE V

POLYMER CALCIUM TOLERANCE TEST (POLYMER SOLUBILITY TEST)

This test evaluates anionic polymers for use as dispersants or scale inhibitors. Dispersant polymers prevent deposition of suspended particles such as calcium and magnesium phosphate, iron (hydr)oxide, zinc hydroxide, calcium carbonate, calcium sulfate, barium sulfate, calcium oxylate clays, etc., which are either present in the make-up water, added as treatments, or which form due to corrosion or precipitation in the system. Hardness can be varied to determine conditions where the polymer can be an effective dispersant. This test predicts the dispersant (scale inhibitor) activity of anionic polymers. Anionic polymers become insoluble at high calcium concentration and elevated temperature. The higher the calcium, the lower the temperature at which turbidity occurs. Polymers tend to be good dispersants if they are soluble at conditions of calcium and temperature. Conversely, polymers will be poor dispersants under conditions where they precipitate.

Dilute calcium and polymer solutions were mixed at room temperature to give 100 ppm actives and either 200 or 400 ppm soluble calcium as $CaCO_3$. The pH was adjusted to 8.5 with dilute NaOH solution. A thermometer was inserted and the test vessel was covered with an aluminum foil. The test solution was then heated gradually. The temperature was noted when turbidity occurred.

Using this method, a number of polymers were tested and the results are listed in Table 5. For polymers provided in accordance with the present invention, no turbidity was visible even after the samples reached 100° C. Additional aliquots of calcium stock solutions were added to the boiling solutions to give 800 and 1600 ppm Ca. After several minutes, there was still no turbidity. These results predict excellent dispersant and scale inhibition activity for these polymers in the present invention under conditions of high hardness and high temperature.

TABLE 5

Polymer Calcium Tolerance (Polymer Solubility) Test Results

| Sample | Polymer composition | MW | Turbidity Temperature at ppm Calcium | | | | |
|---|---|---|---|---|---|---|---|
| | | | 200 | 400 | 800 | 1000 | 1600 |
| A1 | 50/50 L-2-hydroxyethyl-aspartamide/aspartic acid copolymer | 16000 | CAB* | CAB | CAB | — | CAB |
| A2 | 28/72 L-2-hydroxyethyl-aspartamide/aspartic acid copolymer | 33000 | CAB | CAB | CAB | — | CAB |
| C1 | polyaspartic acid | 17000 | 60° C. | — | — | — | — |
| C2 | polyaspartic acid | 25000 | 47° C. | — | — | — | — |
| D1 | non-biodegradable commercial polymer I | — | — | CAB | 74° C. | — | 59° C. |
| E1 | non-biodegradable commercial polymer II | — | — | — | — | CAB | — |
| F1 | non-biodegradable commercial polymer III | — | 55° C. | — | — | — | — |
| G1 | non-biodegradable commercial polymer IV | — | — | — | — | — | CAB |

*CAB = Clear At Boiling.

The data presented in Tables 1–5 demonstrate that the polymers provided in accordance with the present invention are capable of functioning positively as a scale inhibitor and dispersant at a sufficient dose in environments such as cooling towers, boilers and the like. The polymers provided in accordance with the present invention can be used alone or combined with any other biodegradable or non-biodegradable ingredients for the purpose of scale inhibition and/or dispersion.

SYNTHESIS OF N-OXYGENATEDHYDROCARBONAMIDE-AMINO ACID COPOLYMERS

The above-described copolymers were synthesized using the following procedures. First, polysuccinimide with MW weight of 500 to 20,000 of L- or D- or DL-aspartic acid or glutamic acid was reacted with an oxygenatedhydrocarbonamine or with a mixture of an oxygenatedhydrocarbonamine and one or more other oxygenatedhydrocarbonamine at ratios of oxygenatedhydrocarbonamine/polysuccinimide ranging from 0.01/1.00 to 0.99/1.00 in an organic solvent such as DMF, DMSO and the like or in an aqueous medium or an aqueous-organic medium at a suitable temperature for a suitable reaction period.

Next, the poly(succinimide of L- or D- or DL-aspartic acid) was synthesized by heating L- or D- or DL- aspartic acid either in the presence of an acid catalyst such as orthophosphoric acid, polyphosphoric acid, super polyphosphoric acid, a phosphonic acid (such as HEDP, PBTC), or $P_2O_5$, or a mixture of them or a sulfur-containing dehydrating agent such as sulfurtrioxide, sulfurtrioxide precursors, sulfur oxygen acids, sulfonic acids or any other acid or in the absence of a catalyst as would be apparent to those skilled in the art and as described in the journal literature. The polysuccinimide can also be synthesized from maleic anhydride and ammonium, maleic acid and ammonium or from mono or diammonium moleate. The poly(succinimide) obtained may or may not be purified before it is used to react with alkanolamines or other amine derivatives.

The reaction solvent is water, where the polysuccinimide is suspected and the oxygenatedhydrocarbonamine is then added at a pH ranging from 2 to 13, with a preferred pH ranging from 5 to 11. The reaction temperature is 0° to 100° C., preferred 20° to 60° C. The reaction time is 1 to 24 hours, preferably 2 to 10 hours. The unreacted polysuccinimide mol units in the polymer are then hydrolyzed with a base such as NaOH, KOH or $NH_4OH$ or another base to produce the copolymers or terpolymers or polypolymers. This method usually produces a polymer with high molecular weight.

The reaction solvent is DMF, DMSO or other organic solvents, where the polysuccinimide is dissolved in the solvent. The oxygenatedhydrocarbonamine or a solution of the oxygenatedhydrocarbonamine is added to the solution of the polysuccinimide. The reaction product is then precipitated with a less polar solvent such as alcohol or acetone.

The precipitate is collected dried or undried and suspended in water. A base such as NaOH is added to hydrolyze the remaining polysuccinimide mol units to produce the copolymer. The reaction conversion is usually quantitative. Thus, the composition (the molar ratio of oxygenatedhydrocarbonamine/amino acid) can be controlled by controlling the reactant molar ratio oxygenatedhydrocarbonamine/polysuccinimide. The molecular weight of the resulting copolymer can be controlled by controlling the reaction temperature and reaction time as well as the molecular weight of the starting polysuccinimide.

Specific examples of copolymers are listed in Table 6 and the synthesis of those examples is explained below.

For polymer numbers 4 and 5 of Table 6 a solution of ethanolamine (1.53 g, 0.025 mol 1.0 equivalent) in deionized water was added to a magnetically stirred suspension of polysuccinimide (2.5 g, 0.025 mol) in deionized water (20.4 g) over a 17 minute period. The suspension was stirred at room temperature for 28 hours. Almost all solids disappeared within 50 minutes to form a clear solution. The pH range was then adjusted from 9.4 to 8.7 to afford crude N-2-hydroxyethylaspartamide/aspartic acid copolymer. Dialysis of polymer no. 4 to afford pure (polymer no. 5). The product molecular weights determined by GPC and compositions determined by $^{13}C$ NMR spectroscopy are summarized in Table 6.

Polymer No. 1 was similarly prepared but only 0.50 equivalent of ethanolamine was charged. After a suspension of polysuccinimide (5.0 g, 0.050 mol) in deionized water (35 g) was stirred with ethanolamine (1.53 g, 0.0251 mol, 0.50 equivalents) at room temperature for 20.8 hours. 0.041 moles of NaOH solution was added dropwise to form a clear solution of pH 12.98. The solution was further stirred for 1 hour and then neutralized with dilute HCl to pH 6.7. Dialysis (membrane MWCO 12 to 14K) of the crude product afforded polymer No. 1. $^{13}$C NMR analysis indicated that most of residual ethanolamine was not removed. The molecular weight and ethanolamine incorporation are summarized in Table 6.

Polymer No. 2 was prepared by adding dry DMF (60 g) and ethanolamine (4.66 g, 0.0765 mol, 0.50 equivalent) in dry DMF(10 ml) to a stirred powder of polysuccinimide (15.0 g, 0.153 mol) in a 250 ml flask. The solution was stirred at room temperature for 4 hours and at 120° to 150° C. for 1 hour 35 min. After the solution was cooled to room temperature, 200 ml of ethanol was added. The precipitate was filtered in vacuum, dried at 70° to 80° C. and vacuumed to give 9.7 g of solids. The solids were ground and suspended in deionized water (60 g). A NaOH solution (4.1 g of 50% NaOH and 7.0 g of deionized water) was added over 25 minutes at pH less than or equal to 11.8. The resultant solution was further stirred for 50 minutes and then neutralized to pH 7.5 to afford almost pure ethanolamine-polyaspartic acid. Part of N-2-hydroxyethylaspartamide/aspartic acid copolymer was dialyzed (membrane MWCO 500) for 30 hours. The dialyzed solution was concentrated to give pure polymer No. 2. The product molecular weight determined by GPC and composition determined by $^{13}$C NMR spectroscopy are summarized in Table 6.

Polymer No. 19 was prepared as follows: 2-amino-2-methyl-1,3 propanediol (1.39 g, 0.0125 mol) in dry DMF (10 ml) was added to a stirred solution of polysuccinimide (1.23 g, 0.0125 mol) in dry DMF (15 g). After the solution was stirred at room temperature for 20 hours, 150 ml of 1:2 ethanol/cyclohexane was added. The resultant precipitate was centrifuged. The supernatant was decanted and the solids was washed with ethanol. This procedure was repeated once. The solids were dried at 50° C. under a vacuum and then suspended in deionized water. 5.0g of 10.0% NaOH solution was added dropwise to the stirred suspension to form a clear solution. The solution was acidified to pH 2.1 and then dialyzed (membrane MWCO 12 to 14K) for 3 days. The dialyzed solution was concentrated to afford pure polymer no. 16. The product MW determined with GPC and composition determined with $^{13}$C NMR spectroscopy are summarized in Table 6.

For polymer No. 22, to a stirred solution of poly(suc) (10.0g, 0.102 mol) in DMF (80 ml) was added dropwise a solution of ethanolamine (1.87 g, 0.0306 mol) in DMF (15 ml). The solution was further stirred at room temperature for 15 hours. SO$_3$·DMF(14.0 g, 0.092 mol) and pyridine (10.0g) were added. The solution was stirred at 22°–40° C. for 24 hours. 180 ml of ethanol was added. The precipitated polymer product was collected by filtration, dried in vacuo, ground and suspended in deionized water (60 g). 50% of NaOH (8.16 g) was added dropwise to the stirred suspension at pH≦11 to afford crude EAS/ASP copolymer. Dialysis of the crude product gave pure EAS/ASP copolymer polymer No. 22. The produce MW determined with GPC and composition determined with $^{13}$C NMR spectroscopy are summarized in Table 6.

Examples of the copolymers synthesized in addition to those discussed above are listed in Table 6.

TABLE 6

Examples of N-oxygenatedhydrocarbonamide/amino acid Copolymers

| polymer No. | MW of polysuc | M % of alkanol amine charged | reaction temp & time | reaction medium | reaction conversion | product composition | product MW |
|---|---|---|---|---|---|---|---|
| 1. | 94000 | 50% EA* | rt, 20 h | water | 56% | 28/72 HEA/ASP$^b$ | 33000 |
| 2. | 72000 | 50% EA | rt, 4 h 120–50° C., 1.5 h | DMF | 100 | 50/50 HEA/ASP | 16000 |
| 3. | 72000 | 50% EA | rt, 4 h 120–50, 1.4 h | DMF | 100 | 50/50 HEA/ASP | 16500 |
| 4. | 66000 | 100% EA | rt, 27 h | water | 30 | 30/70 HEA/ASP | 60000 |
| 5. | — | — | — | — | — | 28/72 HEA/ASP | 33000 |
| 6. | 48000 | 10% EA | rt, 3.3 h 120–50, 1.6 h | DMF | 100 | 10/90 HEA/ASP | 16400 |
| 7. | 48000 | 20% EA | rt, 4 h 120–65, 1.2 h | DMF | 100 | 20/80 HEA/ASP | 16500 |
| 8. | 72000 | 4% EA | rt, 4 h 12–65° C., 4.2 h | DMF | 100 | 4/96 HEA/ASP | 9400 |
| 9. | — | — | — | — | — | 6/94 HEA/ASP | 9600 |
| 10. | 72000 | 6% EA | 150–80° C., 5 h | DMF | 100 | 6/94 HEA/ASP | 7100 |
| 11. | 48000 | 35% EA | rt, 4 h 130–75° C., 1.3 h | DMF | 100 | 35/65 HEA/ASP | 9400 |
| 12. | 48000 | 30% EA | rt, 4 h 120–60° C., 1 h | DMF | 100 | 30/70 HEA/ASP | 10000 |
| 13. | 48000 | 25% EA | rt, 5h | DMF | 100 | 25/75 | 11000 |

TABLE 6-continued

Examples of N-oxygenatedhydrocarbonamide/amino acid Copolymers

| polymer No. | MW of polysuc | M % of alkanol amine charged | reaction temp & time | reaction medium | reaction conversion | product composition | product MW |
|---|---|---|---|---|---|---|---|
| | | | 140–55° C., 0.9 h | | | HEA/ASP | |
| 14. | 48000 | 40% EA | rt, 3.5 h 120–60° C., 1.3 h | DMF | 100 | 40/60 HEA/ASP | 8300 |
| 15. | 48000 | 27% EA | rt, 4.4 h 80–100° C., 1 h | DMF | 100 | 30/70 HEA/ASP | 29000 |
| 16. | 48000 | 30% EA | rt, 5 h 110–30° C., 0.5 h | DMF | 100 | 30/70 HEA/ASP | 35000 |
| 17. | 48000 | 80% EA | rt, 3 h 120–65° C., 1.3 h | DMF | 100 | 80/20 HEA/ASP | 13300 |
| 18. | 48000 | 30% APO[c] | rt, 22 h 60–80° C., 1 h | DMF | 100 | 30/70 HPA/ASP[d] | 37000 |
| 19. | 94000 | 100% AMPD[e] | rt, 20 h | water | 29 | 29/71 MDHA/ASP[f] | 34000 |
| 20. | 94000 | 10% Tris[g] | 50° C., 5 h | DMF | 10 | 10/90 Tris/ASP[h] | 46000 |
| 21. | 72000 | 7% MEA[i] | rt, 2 h rt-145° C., 1.3 h 145–160° C., 0.5 h | DMF | 100 | 7/93 MEA/ASP[j] | 10700 |
| 22. | 72000 | 30% EA | rt, 15 h then SO₃ @DMF/ py 22–40, 24 h | DMF | 98 | 29/71 SEA/ASP[k] | 51000 |

[a]EA: ethanolamine.
[b]HEA/ASP copolymer = N-(2-hydroxyethyl)aspartamide/aspartic acid copolymer:
[c]APO: 1-amino-2-propanol.
[d]HPA/ASP copolymer: N-(2-hydroxypropyl)aspartamide/aspartic acid copolymer.
[e]AMPD: 2-amino-2-methyl-1,3-propanediol.
[f]N-(1-methyl-2,3-dihydroxypropyl)aspartamide/aspartic acid copolymer.
[g]Tris: tris(hydroxymethyl) amino methane.
[h]Tris: N-(1-hydroxymethyl-2,3-dihydroxypropyl)aspartamide/aspartic acid copolymer.

This invention is applicable to industries where scale inhibition in aqueous systems is desirable, such as industries using cooling towers and the like. Copolymers comprising at least one of N-oxygenatedhydrocarbonamides and at least one of amino acids in amounts ranging from 0.1 to 500 ppm may be used alone or in combination with one or more scale inhibitors such as polyacrylate, polymethylacrylate, a copolymer of acrylic acid and methacrylic acid, a copolymer of acrylic acid and acrylamide, polymaleic anhydride, a copolymer of acrylic acid and maleic acid copolymer, polyol esters, 1-hydroxyethylidene-1,1-diphosphonic acid, 2-phosphono-butane-1,2,4-tricarboxylic acid (PBTC), amino tri(methylene phosphonic acid), an acrylic acid/ acrylamide/amino methane sulfonate terpolymer, polyaspartic acid and mixtures thereof. Such combined compositions may exert a synergistic effect in terms of corrosion inhibition, scale inhibition and dispersancy.

Copolymers comprising at least one of N-oxygenatedhydrocarbonamides and at least one of amino acids in amounts ranging from 0.1 to 500 ppm may also be used alone or in combination with one or more yellow metal corrosion inhibitors such as benzotriazole, tolyltriazole, mercaptobenzothiazole and other azole compounds. Such combinations may exert a synergistic effect in terms of corrosion inhibition.

Copolymers comprising at least one of N-oxygenatedhydrocarbonamide and at least one of amino acids in amounts ranging from 0.1 to 500 ppm may also be used alone or in combination with one or more other corrosion inhibitors such as phosphorous containing inorganic chemicals such as phosphates, pyrophosphates, polyphosphates; hydroxycarboxylic acids or their salts such as gluconic acid, glucaric acid; $Zn^{2+}$, $Ce^{2+}$, $MoO_4^{2-}$, $VO_3^{2-}$, $WO_4^{2-}$. Such combinations may exert a synergistic effect in terms of corrosion inhibition.

Copolymers comprising at least one of N-oxygenatedhydrocarbonamides and at least one of amino acids in amounts ranging from 0.1 to 1000 ppm may also be used alone or in combination with one or more biocides such as oxidizing biocides, e.g., $Cl_2$, NaOCl, NaOBr, or nonoxidizing biocides, e.g., glutaldehyde, isothiazolinones (i.e., 5-chloro-2-methyl-4-isothiazolin-3-one or 2-methyl-4-isothiazoli-3-one) or Kathon WT (a product of Rohm and Hass Company of Philadelphia Pa.), sulfamic acid-stabilized bleach and sulfamic acid-stabilized bromine. Such combinations may exert a synergistic effect in terms of corrosion inhibition, scale inhibition and bacterium control.

In addition, copolymers comprising at least one of N-oxygenatedhydrocarbonamides and at least one of amino acids in amounts ranging from 0.1 to 1000 ppm may be used alone or in combination with scale inhibitors, yellow metal corrosion inhibitors, biocides and other chemical additives.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed:

1. A compound for reducing mineral scale accumulation on metallic surfaces that come in contact with an industrial water, the compound comprising:
   a polymer comprising units of at least one of N-oxygenatedhydrocarbonamide monomers and units of at least one of amino acid monomers or derivatives thereof.

2. The compound of claim 1, wherein the N-oxygenatedhydrocarbonamide further comprises a N-oxygenatedhydrocarbonamide salt.

3. A compound for reducing mineral scale accumulation on metallic surfaces that come in contact with an industrial water, the compound comprising:
   a polymer comprising units of at least one of n-oxygenatedhydrocarbonamide monomers and units of at least one of amino acid monomers, wherein the N-oxygenatedhydrocarbonamide has the formula

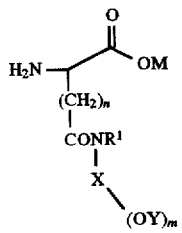

I-α wherein M is selected from the group consisting of hydrogen, alkaline earth metals, alkali metals, $NH_4^+$, $Al^{+3}$, $Fe^{+2}$, $Fe^{+3}$ and $Zn^{+1}$; n is selected from the group consisting of 1 and 2; m ranges from 1 to 10; Y is selected from the group consisting of H, an alkyl group and $SO_3M^1$ and mixtures thereof, wherein $M^1$ is selected from the group consisting of H, alkaline earth metals and alkali metals; $R^1$ is selected from the group consisting of hydrogen, an alkyl group and an aryl group; X is selected from the group consisting of alkylene and arylene.

4. A compound for reducing mineral scale accumulation on metallic surfaces that come in contact with an industrial water, the compound comprising:
   a polymer comprising units of at least one of n-oxygenatedhydrocarbonamide monomers and units of at least one of amino acid monomers, wherein the N-oxygenatedhydrocarbonamide has the formula

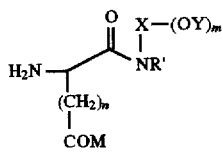

I-β wherein M is selected from the group consisting hydrogen, alkaline earth metals, alkali metals, $NH_4^+$, $Al^{+3}$, $Fe^{+2}$, $Fe^{+3}$ and $Zn^{+1}$; n is selected from the group consisting of 1 and 2; m ranges from 1 to 10; Y is selected from the group consisting of H, an alkyl group and $SO_3M^1$ and mixtures thereof, wherein $M^1$ is selected from the group consisting of H, alkaline earth metals and alkali metals; $R^1$ is selected from the group consisting of hydrogen, an alkyl group and an aryl group; X is selected from the group consisting of alkylene and arylene.

5. A compound for reducing mineral scale accumulation on metallic surfaces that come in contact with an industrial water, the compound comprising:
   a polymer comprising units of at least one of n-oxygenatedhydrocarbonamide monomers and units of at least one of amino acid monomers, wherein the N-oxygenatedhydrocarbonamide has a formula selected from the group consisting of

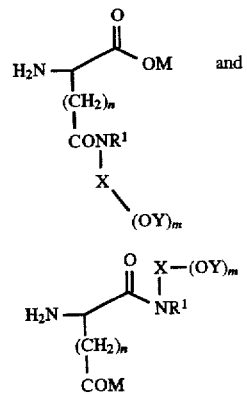

wherein M is selected from the group consisting hydrogen, alkaline earth metals, alkali metals, $NH_4^+$, $Al^{+3}$, $Fe^{+2}$, $Fe^{+3}$ and $Zn^{+1}$; n is selected from the group consisting of 1 and 2; m ranges from 1 to 10; Y is selected from the group consisting of H, an alkyl group and $SO_3M^1$ and mixtures thereof, wherein $M^1$ is selected from the group consisting of H, alkaline earth metals and alkali metals; $R^1$ is selected from the group consisting of hydrogen, an alkyl group and an aryl group; X is selected from the group consisting of alkylene and arylene.

6. The compound of claim 5, wherein $R^1$ has from one to thirty carbon atoms.

7. The compound of claim 5, wherein $R^1$ is substituted with at least one group selected from the group consisting of OH, $SO_3M$ (wherein M is selected from the group consisting of H, an alkaline earth metal, and an alkali metal, $PO_3M_2$ (wherein $M_2$ is selected from the group consisting of H an alkaline earth metal and an alkali metal) and COM (wherein M is selected from the group consisting of OH, OR, and $NR_2$ wherein $R_2$ is an alkyl group).

8. The compound of claim 5, wherein X has from one to thirty carbon atoms.

9. The compound of claim 5, wherein X is straight chained alkylene or X is an arylene.

10. The compound of claim 5, wherein X is branched chained alkylene or X is an arylene.

11. The compound of claim 3, wherein X comprises a straight or branched-chain alkylene group or an arylene group substituted with one or more OH, $SO_3M^3$ (wherein $M^3$ is selected from the group consisting of H alkaline earth metals and alkali metals) $PO_3M^4{}_2$ (wherein $M^4$ is selected from the group consisting of H, alkaline earth metals and alkali metals, $COM^5$ (wherein $M^5$ is selected from the group consisting of OH, OR, and $NR_2$ wherein $R_2$ is an alkyl group).

12. The compound of claim 1, wherein the amino acid is selected from the group consisting of alanine, arginine, aspartic acid, asparagine, cysteine, glutamine, glutamic acid, glycine, histidine, isoleucine, leucine, lysine, methionine, serine, threonine, tryptophan, tyrosine, valine, proline and phenylalanine, hydroxyproline, γ-carboxyglutamic acids, salts of γ-carboxyglutamic acids, o-phosphoserine, o-phosphotyrosine, o-sulfoserine, o-sulfotyrosine, o-phosphothreonine, o-sulfothreonine, s-sulfocysteine, s-phosphocysteine, side chain N-substituted asparagine with $C_1$ to $C_{30}$ alkyl, aryl, sulfoalkyl, o-sulfoaryl, o-phosphoaryl, o-phosphoalkyl, c-sulfonoalkyl, —(—$CH_2CH_2O$—)$_s$—$R^1$, or —(—$CH_2CH_2NR^2$—)$_t$—$R^3$, wherein $R^1$ and $R^2$ are selected from the group consisting of H and a $C_1$ to $C_4$ alkyl group and $R^3$ is a $C_1$ to $C_4$ alkyl group, both s and t range from 1 to 50.

13. The compound of claim 1, wherein the N-oxygenatedhydrocarbonamide is selected from group consisting of N-2-hydroxyethylaspartamide, N-2-hydroxyethygutamide, N-3-hydroxypropylaspartamide, N-3-hydroxypropylglutamide, N-2-hydroxypropylaspartamide, N-2-hydroxypropylglutamide, N-1-methyl-2, 3-dihydroxypropylaspartamide, N-1-methyl-2, 3-dihydroxypropylglutamide, 1-ethyl-2, 3-dihydroxypropylaspartamide, 1-ethyl-2,3-dihydroxypropylglutamide, 2,3-dihydroxypropylaspartamide, N-2, 3-dihydroxypropylglutamide, N-1-hydroxymethyl-2, 3 -dihydroxypropylaspartamide, N- 1-hydroxymethyl -2, 3-dihydroxypropylglutamide, N-bis (2-hydroxyethyl) aspartamide, N-bis(2-hydroxyethyl)glutamide, N(3-bis(N-hydroxyethyl))aminopropylaspartamide, N- (3-bis(N-hydroxyethyl)) aminopropylglutamide, N-p- phenolaspartamide or N-p-phenolglutamide, N-m-phenolaspartamide, N-m-phenolglutamide, N-o-phenolaspartamide, N-dihydroxyphenylaspartamide, N-dihydroxyphenylglutamide, N-2-(2 -hydroxyethylamino) ethylaspartamide, N-2-(2-hydroxyethylamino) ethylglutamide, N- 2-methoxyethylaspartamide, N-2-methoxyethylglutamide, N-(2-o-sulfatoethyl)aspartamide, N-(2-o-sulfatoethyl)glutamide, N-2-(2-hydroxyethoxy) ethylaspartamide, and N-2-(2-hydroxyethoxy) ethylglutamide.

14. A solution comprising:

an industrial process water; and a polymer comprising at least one N-oxygenatedhyrdocarbonamide monomer unit and at least one amino acid monomer unit, or derivative thereof wherein the amino acid is selected from the group consisting of alanine, arginine, aspartic acid, asparagine, cysteine, glutamine, glutamic acid, glycine, histidine, isoleucine, leucine, lysine, methionine, serine, threonine, tryptophan, tyrosine, valine, proline, phenylalanine, hydroxyproline, γ-carboxyglutamic acids, salts of γ-carboxyglutamic acids, o-phosphoserine, o-phosphotyrosine, o-sulfoserine, o-sulfotyrosine, o-phosphothreonine, o-sulfothreonine, s-sulfocysteine, s-phosphocysteine, side chain N-substituted asparagine with $C_1$ to $C_{30}$ alkyl, aryl, sulfoalkyl, o-sulfoaryl, o-phosphoaryl, o-phosphoalkyl, c-sulfonoalkyl, —(—$CH_2CH_2O$—)$_s$—$R^1$, o—(— $CH_2CH_2NR^2$—)$_t$—$R^3$, where $R^1$ and $R^2$ are H or a $C_1$ to $C_4$ alkyl group and $R^3$ is a $C_1$ to $C_4$ alkyl group, both s and t range from 1 to 50.

15. A solution comprising:

an industrial process water; and a polymer comprising at least one N-oxygenatedhydrocarbonamide monomer unit and at least one amino acid monomer unit, wherein the N-oxygenatedhydrocarbonamide is selected from group consisting of N-2-hydroxyethylaspartamide, N-2-hydroxyethylglutamide, N-3-hydroxypropylaspartamide, N-3-hydroxypropylglutamide, N-2-hydroxypropylaspartamide, N-2-hydroxypropylglutamide, N-1-methyl-2, 3-dihydroxypropylaspartamide, N-1-methyl-2,3-dihydroxypropylglutamide, 1-ethyl-2, 3 -dihydroxypropylaspartamide, 1-ethyl-2,3-dihydroxypropylglutamide, 2,3-dihydroxypropylaspartamide, N-2, 3-dihydroxypropylglutamide, N-1-hydroxymethyl -2,3 -dihydroxypropylaspartamide, N-1-hydroxymethyl-2, 3-dihydroxypropylglutamide, N-bis (2-hydroxyethyl) aspartamide, N-bis (2 -hydroxyethyl) glutamide, N (3 -bis (N-hydroxyethyl))aminopropylaspartamide, N- (3-bis (N-hydroxyethyl)) aminopropylglutamide, N-p-phenolaspartamide or N-p-phenolglutamide, N-m-phenolaspartamide, N-m-phenolglutamide, N-o-phenolaspartamide, N-m-phenolglutamide, N -dihydroxyphenylaspartamide, N-dihydroxyphenylglutamide, N-2(2-hydroxyethylamino)ethylaspartamide, N-2 - (2 -hydroxyethylamino) ethylglutamide, N-2-methoxyethylaspartamide, N-2-methoxyethylglutamide, N- (2-o-sulfatoethyl) aspartamide, N- (2-o-sulfatoethyl) glutamide, N-2-(2-hydroxyethoxy) ethylaspartamide, and N-2-(2-hydroxyethoxy) ethylglutamide.

16. The solution of claim 15 further comprising minerals selected from the group consisting of alkaline earth metal phosphates, alkaline earth metal sulfates, alkaline earth metal carbonates, iron (hydro)oxides, zinc hydroxides, manganese oxides, aluminum (hydro)oxides, clays and silicates.

17. The solution of claim 15 further comprising at least one scale inhibitor chosen from the group consisting of polyacrylate, polymethylacrylate, a copolymer of acrylic acid and methacrylic acid, a copolymer of acrylic acid and acrylamide, polymaleic anhydride, a copolymer of acrylic acid and maleic acid polyol esters, 1-hydroxyethylidene-1, 1-diphosphonic acid, 2-phosphono-butane-1,2,4-tricarboxylic acid (PBTC), amino tri(methylene phosphonic acid), an acrylic acid/acrylamide/amino methane sulfonate terpolymer, polyaspartic acid and mixtures thereof.

18. The solution of claim 15 further comprising at least one yellow metal corrosion inhibitor selected from the group consisting of benzotriazole, tolyltriazole, mercaptobenzothiazole and other azole compounds.

19. The solution of claim 15 further comprising at least one corrosion inhibitor.

20. The solution of claim 15 further comprising at least one biocide selected from the group consisting of $Cl_2$, NaOCl, NaOBr, glutaldehyde, isothiazolinones, sulfamic acid-stabilized bleach and sulfamic acid-stabilized bromine.

* * * * *